(12) United States Patent
Tabacchi

(10) Patent No.: US 6,170,951 B1
(45) Date of Patent: Jan. 9, 2001

(54) SPECTACLE FRAME WITH A CRADLE FOR RECEIVING AND ENGAGING AGAINST NON-NOTCHED PORTIONS OF THE CIRCUMFERENTIAL SURFACES OF A PAIR OF LENSES

(75) Inventor: Vittorio Tabacchi, Pieve di Cadore (IT)

(73) Assignee: Safilo Societa Azionaria Frabrica Italiana Lavorazione Ochiali S.p.A., Padua (IT)

( * ) Notice: Under 35 U.S.C. 154(b), the term of this patent shall be extended for 0 days.

(21) Appl. No.: 09/367,109
(22) PCT Filed: Mar. 10, 1997
(86) PCT No.: PCT/IT97/00051
§ 371 Date: Aug. 10, 1999
§ 102(e) Date: Aug. 10, 1999
(87) PCT Pub. No.: WO98/40779
PCT Pub. Date: Sep. 17, 1998
(51) Int. Cl.[7] .................................................. G02C 1/02
(52) U.S. Cl. ............................................. 351/110; 351/124
(58) Field of Search ........................... 351/110, 41, 124

(56) References Cited
U.S. PATENT DOCUMENTS 5,471,257 * 11/1995 Houmand .............................. 351/110
5,781,270 * 7/1998 Fortini .................................... 351/110

FOREIGN PATENT DOCUMENTS

| 0 661 576 | 7/1995 | (EP) . |
| 0 724 178 | 7/1996 | (EP) . |
| 2 274 728 | 8/1994 | (GB) . |
| WO96 02014 | 1/1996 | (WO) . |
| WO9633438 | 10/1996 | (WO) . |

* cited by examiner

Primary Examiner—Hung Xuan Dang
(74) Attorney, Agent, or Firm—Sughrue, Mion, Zinn Macpeak & Seas, PLLC

(57) ABSTRACT

The frame for spectacles comprises a bridge (10), means for attaching the bridge to each lens (11) of a pair of lenses, a sidearm (12) for each lens, a lug (13; 36; 50) for the hinged articulation of each sidearm to the corresponding lens, means for attaching each lug to the corresponding lens. The bridge and the lug comprise a framework (15; 51) of metal wire; the means for attaching the bridge and lugs comprise an eyelet (15a, b, 23) of metal wire for each corresponding lens, a through-screw connection (20; 24) through the eyelet and through a corresponding hole (19, 25) in the lens and a cradle (17, 35) capable of receiving a peripheral portion of the corresponding lens in order to the lug (13; 36; 50) or bridge (10) from rotating about the axis of the through-screw connection.

6 Claims, 3 Drawing Sheets

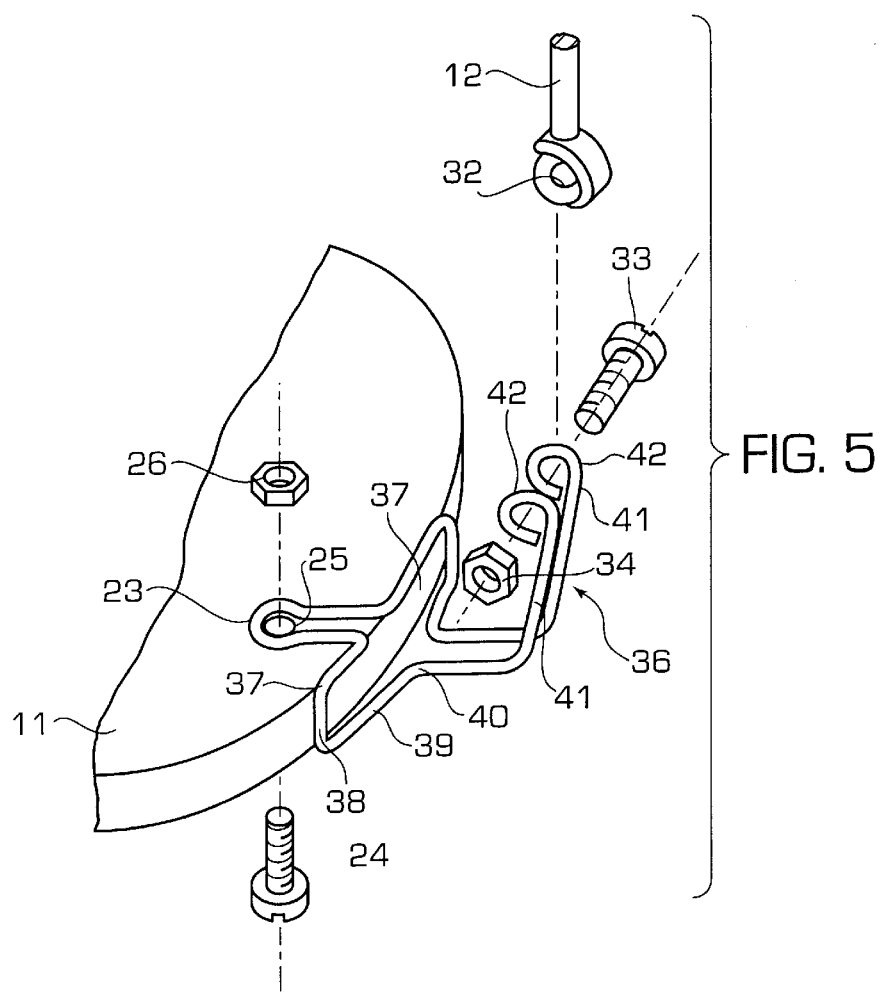
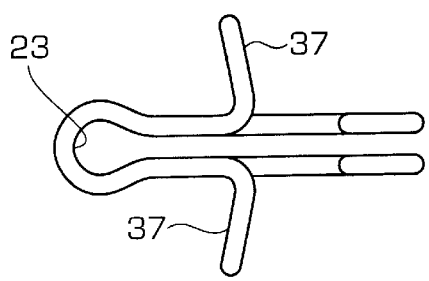
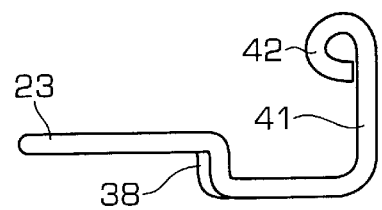
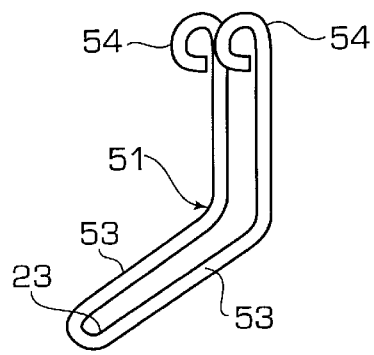

SPECTACLE FRAME WITH A CRADLE FOR RECEIVING AND ENGAGING AGAINST NON-NOTCHED PORTIONS OF THE CIRCUMFERENTIAL SURFACES OF A PAIR OF LENSES

TECHNICAL FIELD

The present invention relates to an improved frame for spectacles of the type including the characteristics described in the preamble to the main claim.

BACKGROUND ART

In particular, this invention lends itself to the production of so-called "super-light" frames produced principally from metal wire.

"Super-light" frames for spectacles have been well received on the market owing to the particular comfort they provide. They exhibit good adaptability to the morphology of the user's face, an extremely light weight and generally an almost complete absence of interference with the user's field of vision.

Some of the better known "super-light" frames have a bridge and lugs, for the articulation of the sidearms, produced using a framework of metal wire.

Bends in the framework form corresponding eyelets by means of which the bridge and the lugs are connected to the respective lenses by means of through-screw connections or by fixed coupling.

A frame for spectacles having the features outlined above is also known from EP 0661576 and WO 96/33438.

In screw connections, in order to prevent the bridge and/or the lug from rotating relative to the lens about the axis of the screw, a notch is generally provided in the peripheral edge of the lens, which notch receives a portion of the metal wire forming the framework of the lug and/or the bridge.

However, this involves undesired machining of the edge of the lens which, at the moment when the notch is made, is more subject to splintering and breakage.

DISCLOSURE OF THE INVENTION

The problem of the invention is to provide a spectacle frame which is structurally and functionally designed to enable the disadvantages described with reference to the prior art to be overcome.

This problem is solved by the invention by means of a spectacle frame produced in accordance with the claims which follow.

BRIEF DESCRIPTION OF THE DRAWINGS

The characteristics and advantages of the invention will be become clear from the following detailed description of some preferred embodiments illustrated by way of non-limiting example with reference to the appended drawings in which:

FIG. 5 is a partial perspective view, with exploded parts, of a second embodiment of a spectacle frame according to the invention;

FIGS. 6 and 7 are plan and side views of a detail of the frame of FIG. 5;

FIG. 9 is a perspective view of the framework of FIG. 8 in detail.

BEST MODE OF CARRYING OUT THE INVENTION

Figure 1:
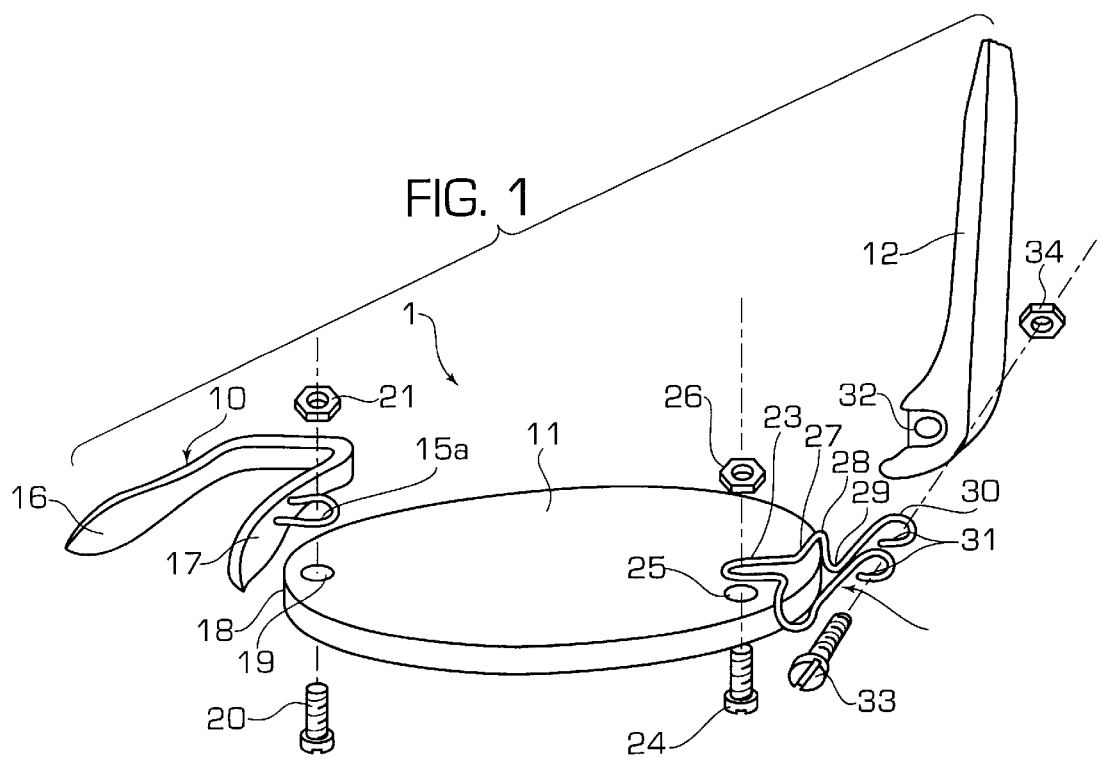
FIG. 1 is a partial perspective view, with exploded parts, of a spectacle frame produced in accordance with the invention.
Figure 2:
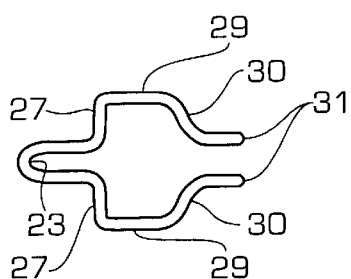
FIGS. 2 and 3 are plan and side views, respectively, of a detail of FIG. 1.
Figure 3:
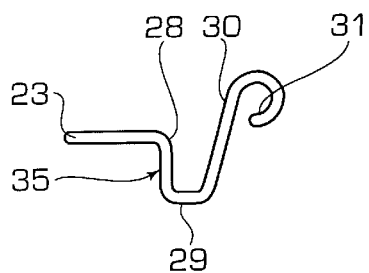
Figure 4:
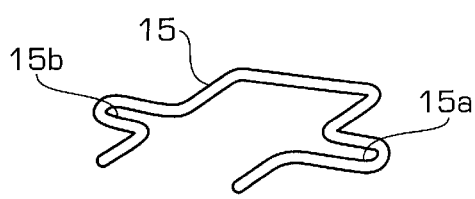
FIG. 4 is a perspective view of the framework of the bridge of the frame of the previous FIGS.

In FIGS. 1 to 4, a spectacle frame produced in accordance with a first embodiment of the invention is generally indicated 1 and comprises a bridge 10 interposed between a pair of lenses 11 (only one is shown, the other lens being arranged specularly on the opposite side of the bridge), a sidearm 12 for each lens, the sidearms being fixed to the outer end of the lens, and a lug 13 for the hinged articulation of each sidearm to the corresponding lens.

The bridge 10 comprises a metal wire framework 15 specularly symmetrical and forming a pair of eyelets 15a, b obtained by bending the metal wire.

The framework 15 is covered with a coating 16 of plastics material from which only the eyelets 15a, b project. The wall of the bridge 10 adjacent to the eyelets 15a, b is shaped in the manner of a cradle 17 adapted to receive a peripheral portion 18 of the edge of the corresponding lens 11 while matching the profile thereof.

The bridge 10 is attached to the corresponding lens by means of the screw 20 and nut 21 connection passing into a hole 19 in the lens and through the corresponding eyelet 15a, b. The cradle 17 and the corresponding peripheral portion 18 of the lens, by virtue of being coupled to one another, prevent the bridge 10 from rotating about the axis of the through-screw connection, thus providing means for attaching the bridge to the lens.

Each lug 13 is likewise shaped from metal wire bent specularly and a central eyelet 23 can be seen which is capable of receiving a screw 24 passing into a hole 25 in the lens in order to fasten the lug 13 to the lens by means of a nut 26. Extending from the eyelet 23 are two arms of metal wire bent in a symmetrical shape into a first portion 27 moving away from the eyelet 23, a second portion 28 at right-angles to the first and extending along the edge of the lens, substantially at right-angles to the plane of said lens, a third portion 29 forming an elbow and tending to converge towards the centre and a fourth, substantially straight portion 30 which extends away from the lens and the free end of which is closed to form a respective eyelet 31 for the hinged articulation of the corresponding sidearm 12. The sidearm 12 in its turn has a hole 32; the hinged connection is produced by means of a screw 33 with an associated nut 34.

It will be appreciated that the shape of the first and second portions 27, 28 of metal wire in this case also defines a cradle 35 which forms, with the eyelet 23, means of attaching the lug to the lens and capable of preventing the lug from rotating about the axis of the through-screw connection 24. The third and fourth portions 29, 30, on the other hand, form a spring system permitting limited loaded opening out of the sidearm 12 beyond the state of maximum opening.

A second embodiment of the invention is shown in FIGS. 5 to 7. Analogous details are marked by the same reference numerals as in the preceding example.

The frame of the second embodiment differs from the frame 1 basically in the shape of the lug which is marked 36 in this second embodiment and which is likewise formed from specularly bent metal wire. In this case too, the lug 36 forms a central eyelet 23 capable of receiving a screw 24 passing into a hole 25 in the lens in order to fasten the lug to said lens by means of a nut 26. Extending from the eyelet 23 are two arms of metal wire bent in a symmetrical shape into a first portion 37 moving away from the eyelet 23, a second portion 38 at right-angles to the first and extending along the edge of the lens, substantially at right-angles to the plane of said lens, a third portion 39 extending parallel to the first (37) on the opposite corner of the edge of the lens and returning towards the centre of the lug to form an elbow 40 extending away from the lens and lengthened to form a fourth, straight portion 41 of which the free end is closed to form a respective eyelet 42 for the hinged articulation of the corresponding sidearm 12. The sidearm 12 in its turn has a hole 32; the hinged connection is produced by means of a screw 33 with an associated nut 34.

Figure 8:
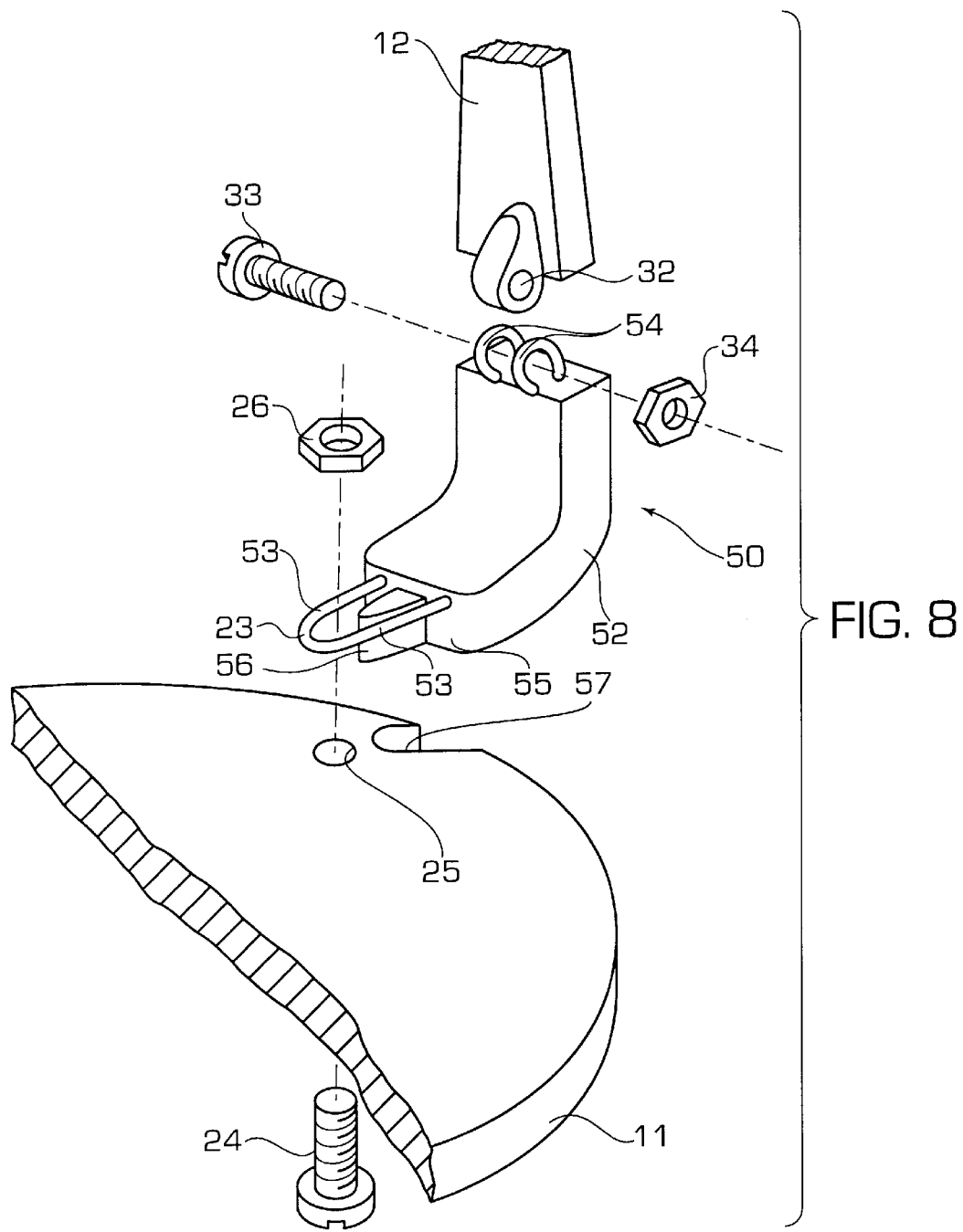
FIG. 8 is a perspective view, with exploded parts, of a third embodiment of the invention.

A third example of a lug, marked 50 in FIGS. 8 and 9, differs from the preceding lugs by the provision of a framework of metal wire 51 embedded in a body of resin 52. The framework 51 in this case too has a symmetrical shape with two arms 53 which extend from a formation with a central eyelet 23 and are bent to form an elbow and have, at the free ends, a respective eyelet 54 for the hinged articulation of a corresponding sidearm 12.

The resin body 52 has a surface 55 facing the peripheral edge of the lens 11 and defining a cradle, although of limited extent, which matches the shape of the corresponding peripheral portion of the lens in order to prevent the rotation thereof about the axis of the screw 24. In order further to promote the solidity of this connection, it is preferably provided that the body 52 has, in the area of the surface 55, a projecting piece 56 capable of engaging in a recess 57 formed in the edge of the lens 11.

In that case, the lug 50 does not act as a spring.

One of the advantages of the frame of the invention is the fact that the work of the optician who has to assemble the lenses and the frame is greatly, simplified because, with respect to the embodiments of FIGS. 1 and 5, the only work required on the lens is the boring of holes for the through-screw connections; this greatly reduces the risk of breakage and splintering of the lens in the final machining stage. In addition, the resilience of the metal wire forming the frame compensates in a simple and reliable manner for any slight cutting defects in the lens, because the frame is able to adapt resiliently to the lens. This resilience makes the frame very adaptable to the user's morphology and capable of resisting slight jolts and stresses by becoming deformed without damage.

What is claim is:

1. A frame for spectacles, the frame comprising
   a bridge having a pair of eyelets respectively corresponding to a pair of lenses, each eyelet for receiving a screw that extends through a first hole provided in a corresponding lens;
   a pair of sidearms respectively corresponding to the pair of lenses; and
   a pair of lugs respectively corresponding to the pair of lenses and said pair of sidearms, each lug having a first eyelet for receiving a screw that extends through a hole provided in the corresponding sidearm, and a second evelet for receiving a screw that extends through a second hole provided in the corresponding lens, such that said sidearms are respectively hinge coupled to the corresponding lenses,
   wherein rotation prevention means is provided for said bridge and each of said lugs, said rotation prevention means for receiving and engaging against a non-notched portion of a circumferential surface of the corresponding lens to prevent said lugs and said bridge from rotating relative to the pair of lenses,
   wherein said rotation prevention means of said bridge comprises a first cradle for receiving a portion of the circumferential surface of the corresponding lens,
   wherein said rotation prevention means of each of said lugs comprises a second cradle including two arms of metal wire bent symmetrically into a first portion extending substantially parallel to a major surface of the corresponding lens and departing from each other, and a second portion substantially perpendicular to said first portion and extending in a width direction of the circumferential surface of the corresponding lens.

2. A frame according to claim 1, wherein said two arms of each of said lugs further comprises a third portion extending from said second portion to form an elbow, and
   wherein said two arms converge towards each other at said third portion.

3. A frame according to claim 1, wherein said two arms of each of said lugs extend symmetrically from said second eyelet.

4. A frame according to claim 1, wherein said two arms of each of said lugs constitutes a spring system for the resilient opening of the corresponding sidearm.

5. A frame for spectacles the frame comprising:
   a bridge having a pair of eyelets respectively corresponding to a pair of lenses, each eyelet for receiving a screw that extends through a first hole provided in a corresponding new line lens;
   pair of sidearms respectively corresponding to the pair of lenses; and
   a pair of lugs respectively corresponding to the pair of lenses and said pair of sidearms, each lug having a first eyelet for receiving a screw that extends through a hole provided in the corresponding sidearm, and a second eyelet for receiving a screw that extends through a second hole provided in the corresponding lens, such that said sidearms are respectively hinge coupled to the corresponding lenses,
   wherein said bridge and said lugs are made of bent metal wire,
   wherein rotation prevention means is provided for said bridge and each of said lugs. said rotation prevention means including a cradle for receiving and engaging against a non-notched portion of a circumferential surface of the corresponding lens to prevent said lugs and said bridge from rotating relative to the pair of lenses,
   wherein said bent metal wire of each of said lugs is at least partially embedded in a body of resin, and said body of resin defines said cradle.

6. A frame according to claim 5 wherein said body of resin has at least one projection in an area of said cradle, said at least one projection being insertable into a recess provided in the corresponding lens.

* * * * *